United States Patent [19]
Burton

[11] 3,764,179
[45] Oct. 9, 1973

[54] BUBBLE DOME VEHICLE ROOF TOP ATTACHMENT
[76] Inventor: Norman Burton, 300 W. 55th St., Apt. 12L, New York, N.Y. 10019
[22] Filed: July 15, 1971
[21] Appl. No.: 162,977

[52] U.S. Cl. .......................................... 296/137 R
[51] Int. Cl. .............................................. B60j 7/10
[58] Field of Search ........... 296/102, 137 R, 137 E; 49/466, 164; 52/206, 208, 403; 160/225; 244/121

[56] References Cited
UNITED STATES PATENTS
| | | | |
|---|---|---|---|
| 2,258,724 | 10/1941 | Wagner | 52/403 |
| 2,680,582 | 6/1954 | Hansen | 244/121 |
| 3,156,415 | 11/1964 | Walker | 296/137 R |
| 2,667,379 | 1/1954 | Baze | 296/102 |
| 2,645,159 | 7/1953 | Darroch | 296/137 R |
| 2,115,432 | 4/1938 | Simon | 296/137 R |

Primary Examiner—Benjamin Hersh
Assistant Examiner—Robert R. Song
Attorney—Laforest S. Saulsbury et al.

[57] ABSTRACT
A sun deck bubble dome roof attachment formed of transparent plastic and adapted to be easily fitted into a sun deck opening of a rooftop and held in grooves extending about the edges of the sundeck opening by a slide roof retracted and urged against the rear edge of the top attachment to lock the same in the grooves of the sun deck opening. A gasket extends about the edge of the top attachment to provide a watertight engagement of the side edges with the grooves of the sides of the openings. Swingable latch members are provided on the forward and rearward edges of the top attachment serving to clamp the side edges against the bottom walls of the roof top and to prevent its outward release from the sun deck opening. The rubber gasket grips the top in such a manner that should a forced thrust upwardly from within the vehicle as upon the rider being thrown upwardly and with the engagement of his head the roof top will be disengaged so as to prevent the rider from being severely injured by the head blow. The clamp devices provided upon the top attachment are such as to make the engagement with an opening merely cut into the roof of the vehicle to undersize from the area of the bubble top so that the bubble top can be locked in place without the slide door of the sun deck serving to lock the bubble top in place.

6 Claims, 7 Drawing Figures

PATENTED OCT 9 1973 3,764,179

INVENTOR.
NORMAN BURTON
BY Polachek & Saulsbury
ATTORNEYS

PATENTED OCT 9 1973 3,764,179

INVENTOR.
NORMAN BURTON
BY
Polachek & Saulsbury
ATTORNEYS

BUBBLE DOME VEHICLE ROOF TOP ATTACHMENT

This invention relates to a bubble dome top attachment for use with sun deck vehicles.

It is an object of the present invention to provide a transparent bubble top that is adapted to fit in a sun deck opening and to be held in place by the sun deck slide door serving to egage the rear edge of the bubble top and to force the forward edge into the forward groove within the opening.

It is another object of the invention to provide a bubble top attachment for sun deck openings which are made secure within the opening and which are provided a gasket serving to enter the grooves in the side edges of the openings to make for a watertight joint and at the same time serve as a safety connection to permit outward release of the bubble top upon engagement of the head of a rider being thrown upwardly from his seat.

It is still another object of the invention to provide a sun deck roof top providing for a bubble projection upwardly from the top surface of the roof and to permit even viewing of the outer space above the top from any position of the head of a rider and at the same time provide additional head space for this rider.

It is a further object of this invention to provide a bubble dome top for sun deck openings which is adapted not only to be fitted into regular sun deck openings provided in vehicle roofs but also the same top attachment may be held in place by clamp devices provided upon the forward and rearward edges of the top attachment.

Other objects of the invention are to provide a bubble top dome attachment for sun deck vehicles, having the above objects in mind, which is of simple construction, easy to install on the vehicle roof, light in weight, inexpensive to manufacture, has a pleasing appearance to accentuate the overall appearance of the vehicle, efficient and effective in use.

For a better understanding of the invention reference may be had to the following detailed description taken in connection with the accompanying drawing, wherein.

Figure 1:
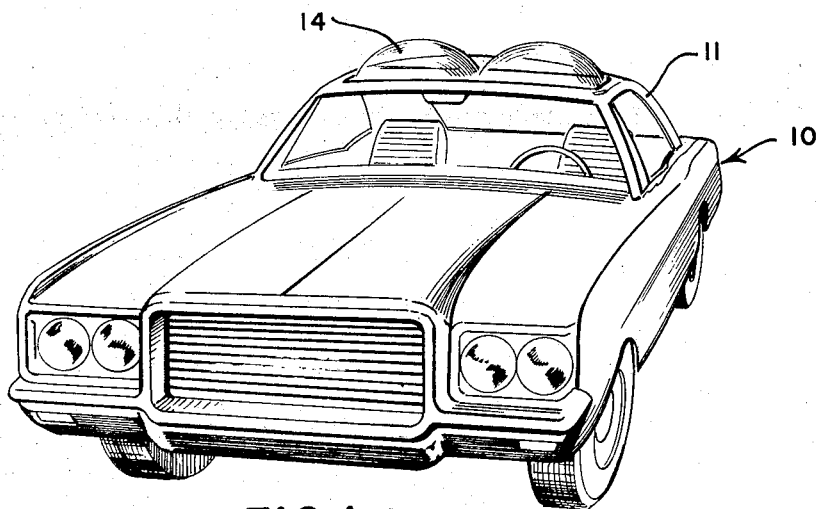
FIG. 1 is a perspective view of a vehicle employing the bubble dome top insert or attachment embodying the features of the present invention.
Figure 2:
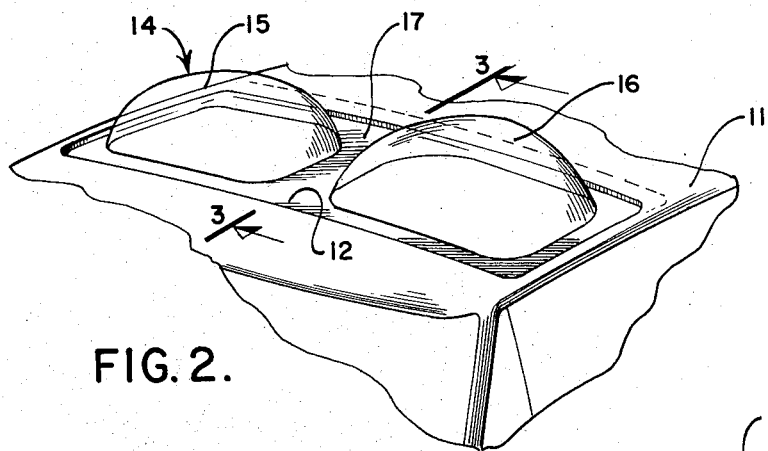
FIG. 2 is a fragmentary and enlarged perspective view taken of the bubble top insert as fitted into the roof of the vehicle and within the forward opening of the sun deck roof.
Figure 4:
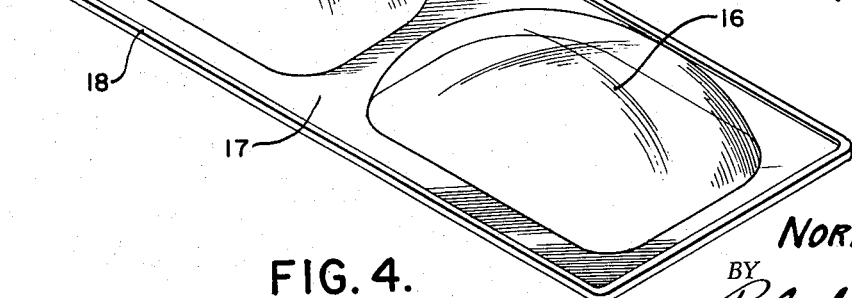
FIG. 4 is an enlarged perspective view of the bubble dome top removed from the sun deck opening of the roof.
Figure 3:
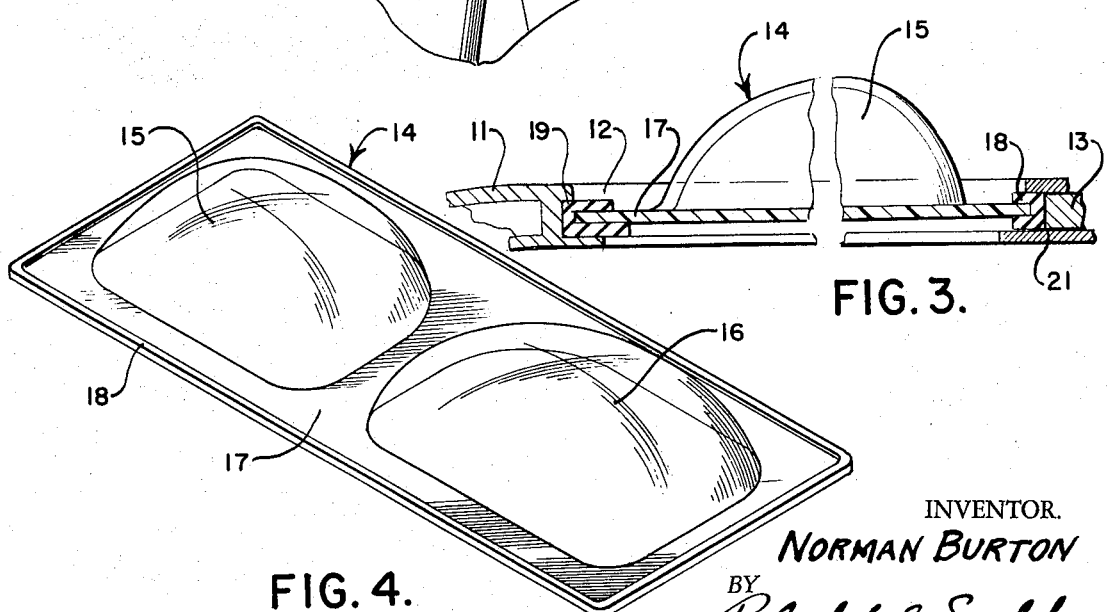
FIG. 3 is an enlarged longitudinal sectional view of the bubble top insert showing its connection within the channel groove of the sun deck opening with the sun deck slide door retracted from the opening and pressing against the rear edge of the bubble top insert to hold it forwardly in place within the roof opening.

Referring now to the figures, 10 represents generally a motor vehicle having a roof 11 of the sun deck type providing for an opening 12 that is normally closed by a forwardly and rearwardly slidable door or cover member 13 that is usually power operated but which at times is retracted rearwardly to permit the riders within the forward seat of the vehicle to view upwardly and outwardly from the roof top and to be exposed to the rays of the sun.

According to this invention an advantage is taken of this opening so tat the roof top may be provided with a bubble dome shaped top attachment indicated generally at 14 that will permit the riders to view outwardly at all times through the opening 12 and regardless of weather conditions. Since the attachment 14 has upwardly extending dome-shaped formations the light rays penetrating the attachment, the attachment being formed of transparent plastic, from many directions and such as to relieve the rider of glare when viewing outwardly through this attachment.

In this instance, the bubble top attachment has two dome-shaped upwardly extending projections 15 and 16 spaced from one another laterally to respectively overlie the heads of two riders including the driver of the vehicle. These projections are sufficiently large and rounded so that the occupant or rider can view directly through this thickness of the dome projection material from all positions to which his head may be turned and the distance between the eyes of the rider to the inner face of the dome projections being generally the same regardless of the direction in which the head is turned to view the outer space, above the attachment and roof. With the plastic material being of somewhat colored hue, there is little opposturnity under such viewing conditions that any glare of light will appear in the eyes of the rider. Thus, this bubble dome top gives to the rider not only an upwardly viewing advantage, but comfort while under the roof of the vehicle and more head space. If the rider is thrown upwardly upon the vehicle, striking an obstacle, as in the case of an accident, the rider may be relieved of any contact or bump of the head with the roof top because of the provision of this additional space immediately above the head of the rider and within the vehicle. As will be apparent in further descriptions of this bubble top, not only is the rider given greater space, but should the thrust be such that there has been a tendency to throw the rider out of the vehicle, this bubble top may act as a safety measure and be broken away from the opening to thereby minimize the blow upon the head of the rider upon such instance takeing place.

Roots or bottoms of the bubble dome shaped projections 15 and 16 is a laterally extending flat area 17 of rectangular shape conforming to the size of the sun deck opening 12 and having about its peripheral edge a continuous internally channeled rubber seal or gasket 18 providing for flange protions extending respectively inwardly over the top and bottom surfaces of the flat area 17 and a bight or outer edge adapted to fit within channel recesses 19 within forward and side edges of the opening 12 to render the extension of the bubble top 14 within the opening 12 made in a water tight manner. The ordinary slidable roof door 13 operates in a laterally extending slot opening 21 that makes for a channel edge when taken with the slide sun deck door 13 for accommodating the rear edge of the gasket 18. With a forward thrust provided by the mechanism for operating the slide door 13, not shown, but adapted to provide a forward thrust, will keep the forward edge of the bubble top 14 in tight fitting engagement with the channel groove in the forward edge of the opening 12. Thus there is little opportunity for the bubble top 14 to lift out of the opening 12 of the roof top 11 except under excess speeds of the vehicle or by an internal blow as by the head of a rider in the case of an accident, when at this time the edge of the flat area 17 can break away from its sealing gasket 18 and allow the bubble top 14 to be lifted but partially or fully from the opening 12 in the roof 11. It can be seen that this can be effected only under unusual circumstances such as excessive high speeds and from an internal blow in the case of an accident. Thus not only is this bubble dome top available for viewing which is the principal object for providing the same, but also as a safety measure to prevent harmful bumping of the head under rough driving conditions or in the case of accident.

Figure 5:
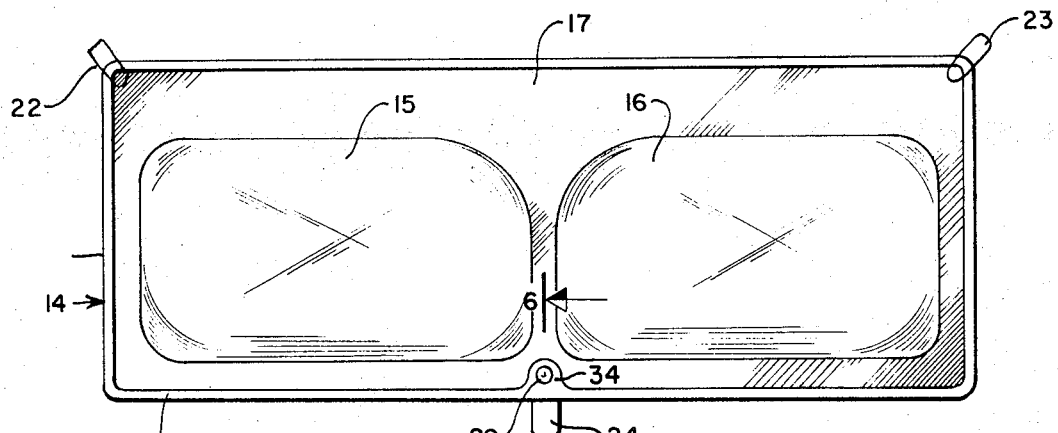
FIG. 5 is a top plan view and showing its forward and rear retaining latches constructed according to the detailed showings of FIGS. 6 and 7.

In order to be more assured of this bubble dome top being tightly sealed within the sun deck opening latch devices 22 and 23 located at the forward corners of the flat area 17 of the bubble top 14 as best shown in FIG. 5 and at least a similar latch device 24 provided midway the lateral extent of the rear edge of the bubble top attachment so that an effective clamping action can be made for securing the bubble top within the opening 12

Figure 6:
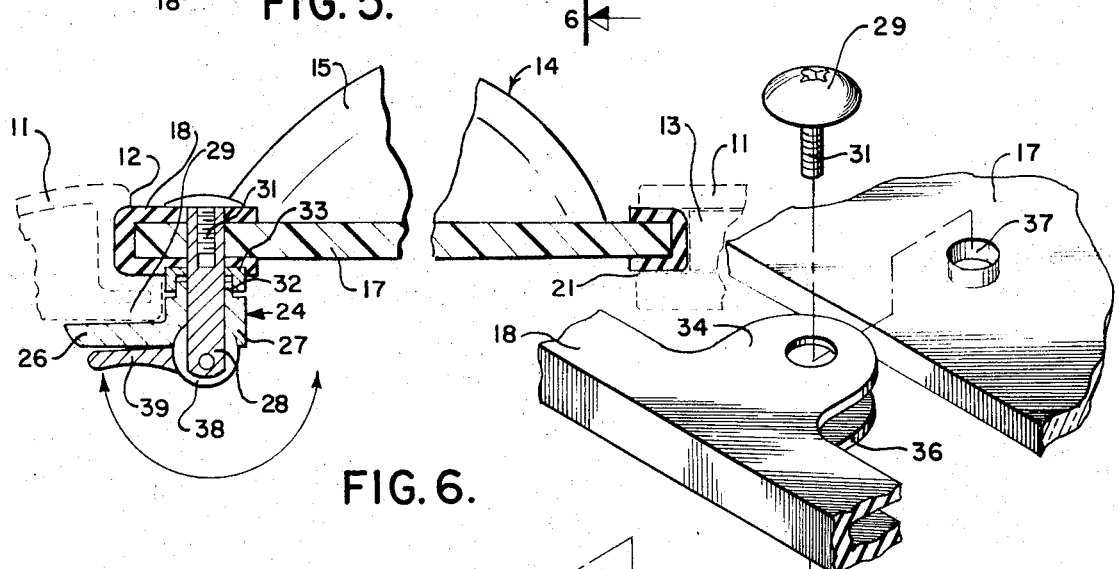
FIG. 6 is an enlarged fragmentary longitudinal sectional view of the bubble dome top taken through one of the securing latches and as viewed on line 6—6 of FIG. 5 with the forward and rearward edges of the roof opening being illustrated with phantom lines.
Figure 7:
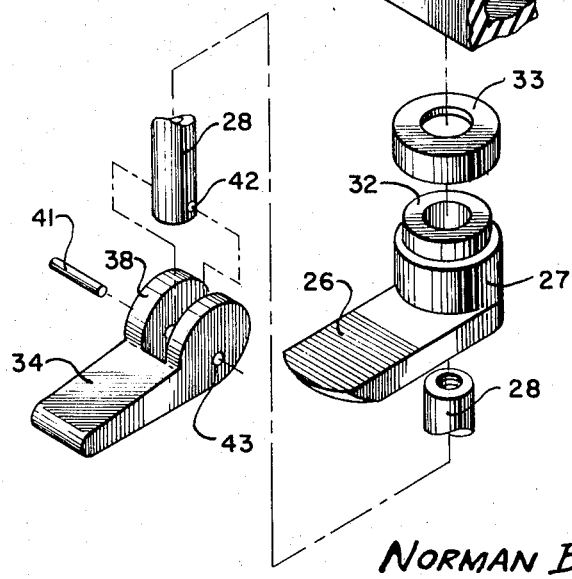
FIG. 7 is an enlarged fragmentary and exploded view of the bubble dome top and of the rear latch parts of FIG. 6 being separated from one another.

These clamp devices 22, 23 and 24 have latch arms 26 projecting from a spindle hub 27 turnable about a pin 28 that extends upwardly through the flattened area 17 of the bubble top attachment, as best seen in FIG. 6 and through the top and bottom legs of the gasket 18 and made secure against downward displacement by a flat head 29 of a screw 31 threaded into the upper end of a clamp pin member 28. The spindle hub 27 has a reduced diameter 32 that extends into an inverted cup shaped washer 33 for durable engagement therewith. The gasket 18 has spaced lug projections 34 and 36 with holes therein alignable with a hole 37 in the flattened area 17 all of which holes adapted to accommodate the upper end of the clamping pin 28, see FIG. 7. The arm 26 will engage the underside of the roof top from the opening 12 and is clamped thereagainst to hold the gasket 18 and a flattened area portion 17 of the bubble top 14 in place within the channel grooves of the sun deck opening 12. This is effected by a bifurcated rounded head 38 of a hand clamp lever 39 pivotally connected by a pin 41 entering a hole 42 aligned with holes 43 in the hand 39 and of the clamp pin 28. The similar clamp devices 22 and 23 at the forward edge of the bubble top 14 as shown in FIG. 5 will keep down the forward corners within the sun deck opening and raise the speed at which the vehicle can be driven without permitting the list of the bubble top 14 from the sun deck and from the gasket 18.

While the insertion of the bubble top within the sun deck opening of the roof 11 and the insertion therein by the slide door of the sun deck makes for easy installation of the bubble top 14, but by the use of the clamp devices 23 and 24 the bubble top can be installed in an opening effected by cutting away the roof of a vehicle to provide such an opening therein. The cutting of the opening in the roof of the vehicle should be made sufficiently undersized to allow for the extension of the rubber gasket 18 and the edges of the flat area portion 17 into substantial overlying engagement with the roof walls about the opening and such that the clamp devices can have substantial engagement with the underwalls of the roof.

It should now be apparent that there has been provided a bubble dome top for sun deck roofs of vehicles and which can also be readily adapted to roofs into which openings can be cut wherein there will be provided good vision upwardly and outwardly through the roof top and through the bubble top and that by the provision of the upwardly extending bubble projections glare upon looking through these projections is minimized and wherein a large head space will be provided for the riders immediately above their heads.

It should be further apparent that any number of bubble projections can be provided but preferably two or even a single one so that the normal two or three riders on the front seat will have adequate head space above their heads and good viewing from their positions thereunder. By the provision of the gasket extended about the edge of the flattened bottom portion of the bubble top, it will be apparent that a water tight connection of the bubble top is made with the opening of the roof and also an effective safety feature is provided by the same in that the flattened area portion can break away under conditions throwing the rider upwardly into the roof of the vehicle and thereby eliminate any severe injury to his head.

While various changes may be made in the detailed construction of this bubble dome top attachment and in the manner in which the same may be assembled within an already prepared opening in the roof top or in the cut opening thereof, it shall be understood that such changes will be within the spirit and scope of the present invention as defined by the appended claims.

What is claimed is:

1. In combination, vehicle roof-top walls defining as a part thereof a sun deck roof-opening provided therein, at least one oversize bubble dome top attachment shaped in a predetermined shape substantially filling the roof-opening and having an upwardly extending dome-shaped projection and a laterally extending flattened area including forward and rearward edges, said roof-top walls having channel shaped grooves opening inwardly into said roof-opening, the attachment having outer portions of the edges engagable in said grooves within the roof-opening, a channel section gasket secured on the outer edge portions overlapping the roof-top walls and accomodated in said grooves within the roof-opening, the roof-top walls having operably mounted within the roof-opening a retractable door cover having a forward edge thereof engageable with the rear edge of the bubble top to press the forward edge of the bubble top into a forward one of said grooves in secure engagement therewith.

2. The combination as defined in claim 1 and said gasket being arranged upon the edge of the flattened area portion such as to permit the breakaway of the flattened portion to thereby provide a safety device to permit the separation of the bubble top attachment from the opening upon an upward thrust of the rider and the engagement of his head with the underside of the dome projections and thereby minimize injury to the rider upon the rider being thrown into the roof of the vehicle.

3. The combination as defined in claim 1, in which the bubble dome top is detachable and the roof-top walls have an underside, and the combination further including clamping means provided on the forward and rear edges of the bubble top, for engagement with the underside of the roof-top walls.

4. The combination of claim 3, and each of said claimping means comprising a pin extending through the flattened portion of the bubble top attachment, and through the gasket flanges, and a clamp arm turnable upon a pin and an eccentric hand clamp member pivoted upon the lower end of the pin and operable against the clamp arm to effect the downward clamping engagement of the edges of the bubble top attachment against the overlapping edges of the walls of the sun deck roof-opening.

5. The combination as defined in claim 4 and said gasket having inwardly extending lug formations for accommodating the clamp pin member of the clamping devices.

6. The combination of claim 1, and said bubble top attachment having a further buble projection laterally spaced from the other bubble top projection and positioned to overly another forward seat rider position of a vehicle of which the roof-top walls are a mountable part thereof, and these bubble top projections being each dome shaped and being fromed of transparent material through which view can be made free of glare.

* * * * *